(12) United States Patent
Feller

(10) Patent No.: US 9,178,573 B2
(45) Date of Patent: Nov. 3, 2015

(54) RF/DIGITAL SIGNAL-SEPARATING GNSS RECEIVER AND MANUFACTURING METHOD

(71) Applicant: Walter J. Feller, Airdrie (CA)

(72) Inventor: Walter J. Feller, Airdrie (CA)

(73) Assignee: HEMISPHERE GNSS INC., Scottsdale, AZ (US)

( * ) Notice: Subject to any disclaimer, the term of this patent is extended or adjusted under 35 U.S.C. 154(b) by 249 days.

(21) Appl. No.: 13/847,429

(22) Filed: Mar. 19, 2013

(65) Prior Publication Data

US 2014/0125518 A1    May 8, 2014

Related U.S. Application Data

(63) Continuation-in-part of application No. 13/019,866, filed on Feb. 2, 2011, now abandoned.

(60) Provisional application No. 61/300,750, filed on Feb. 2, 2010.

(51) Int. Cl.
| | |
|---|---|
| *G01S 19/13* | (2010.01) |
| *H04B 7/00* | (2006.01) |
| *H04B 15/00* | (2006.01) |
| *G01S 19/47* | (2010.01) |
| *G01S 19/53* | (2010.01) |
| *G01S 3/48* | (2006.01) |

(Continued)

(52) U.S. Cl.
CPC ... *H04B 7/00* (2013.01); *G01S 3/48* (2013.01); *G01S 19/47* (2013.01); *G01S 19/53* (2013.01); *H04B 15/00* (2013.01); *G01S 19/21* (2013.01); *H04B 1/0028* (2013.01)

(58) Field of Classification Search
CPC .................................. G01S 19/22; G01S 19/13
See application file for complete search history.

(56) References Cited

U.S. PATENT DOCUMENTS

| | | | |
|---|---|---|---|
| 5,430,654 A | 7/1995 | Kyrtsos et al. | |
| 6,272,349 B1 * | 8/2001 | McGrath et al. | ........... 455/456.3 |

(Continued)

FOREIGN PATENT DOCUMENTS

WO    WO-2010005945    1/2010

OTHER PUBLICATIONS

Non-Final Action dated Jul. 23, 2012 and Final Office Action dated Nov. 19, 2012 for U.S. Appl. No. 13/019,866.*

(Continued)

*Primary Examiner* — Daniel Washburn
*Assistant Examiner* — Amneet Singh
(74) *Attorney, Agent, or Firm* — Schmeiser, Olsen & Watts LLP

(57) ABSTRACT

An RF/digital signal-separating receiver is provided for GNSS and other RF signals. The receiver includes a first master antenna and a second slave antenna, which are positioned in spaced relation for directional, radio compass applications. First and second downconverters and first and second ADCs are located under the first and second antennas in analog signal areas, which configuration minimizes cross-coupling RF signals from the antennas and reduces noise. The first and second ADSs are connected to respective first and second correlators in a digital signal location, which is centrally located relative to the antennas. The correlators are connected to a microprocessor for computing distances for the received signals, from which the receiver's orientation or attitude is determined. A method of manufacturing receivers with this configuration is also disclosed.

5 Claims, 4 Drawing Sheets

(51) Int. Cl.
  *G01S 19/21*  (2010.01)
  *H04B 1/00*  (2006.01)

(56) References Cited

U.S. PATENT DOCUMENTS

| | | | |
|---|---|---|---|
| 6,795,487 B1 * | 9/2004 | Bickerstaff et al. | 375/147 |
| 7,136,751 B2 * | 11/2006 | Pinto et al. | 701/470 |
| 7,250,903 B1 * | 7/2007 | McDowell | 342/357.59 |
| 7,454,290 B2 | 11/2008 | Alban et al. | |
| 7,513,070 B2 | 4/2009 | Ogura et al. | |
| 7,605,749 B2 | 10/2009 | Lawrence | |
| 8,130,142 B2 | 3/2012 | Zietz et al. | |
| 8,140,223 B2 | 3/2012 | Whitehead et al. | |
| 8,265,826 B2 | 9/2012 | Feller et al. | |
| 2002/0004691 A1 | 1/2002 | Kinashi et al. | |
| 2002/0009164 A1 * | 1/2002 | Pritchett et al. | 375/340 |
| 2005/0114023 A1 | 5/2005 | Williamson et al. | |
| 2008/0096509 A1 | 4/2008 | Ling | |
| 2008/0195268 A1 | 8/2008 | Sapilewski et al. | |
| 2008/0269988 A1 * | 10/2008 | Feller et al. | 701/41 |
| 2009/0121932 A1 | 5/2009 | Whitehead et al. | |
| 2010/0312428 A1 | 12/2010 | Roberge et al. | |
| 2011/0015817 A1 | 1/2011 | Reeve | |
| 2011/0018765 A1 | 1/2011 | Whitehead et al. | |
| 2011/0054729 A1 | 3/2011 | Whitehead et al. | |
| 2012/0139784 A1 | 6/2012 | Ashjaee et al. | |
| 2012/0218143 A1 | 8/2012 | Zietz et al. | |
| 2012/0223860 A1 | 9/2012 | Leclercq | |
| 2013/0027245 A1 | 1/2013 | Lennen | |
| 2013/0073142 A1 | 3/2013 | Hergesheimer et al. | |
| 2013/0211716 A1 | 8/2013 | Kellar | |

OTHER PUBLICATIONS

Ott W., Henry,"Partitioning and Layout of a Mixed-Signal PCB", www.pcdmag.com, Printed Circuit Design, Jun. 2001.*

"Extended European Search Report", European Patent Application No. 10802861.4, (Nov. 5, 2012).

Lu, Gang, "Development of a GPS Multi-Antenna System for Attitude Determination", www.ensu.ucalgary.ca/GradTheses.html; PhD Thesis; Jan. 1995.

* cited by examiner

RF/DIGITAL SIGNAL-SEPARATING GNSS RECEIVER AND MANUFACTURING METHOD

CROSS-REFERENCE TO RELATED APPLICATION

This application is a continuation-in-part of and claims priority in U.S. application Ser. No. 13/019,866, filed Feb. 2, 2011, which is a nonprovisional application of and claims priority in U.S. Provisional Patent Application No. 61/300,750, filed Feb. 2, 2010, both of which are incorporated herein by reference.

BACKGROUND OF THE INVENTION

1. Field of the Invention

The present invention relates generally to RF/digital receivers, and in particular to a signal-separating configuration for GNSS multi-antenna directional receivers and a receiver manufacturing method, which provides more accurate data in a more compact and economical size than previous GNSS-based heading devices.

2. Description of the Related Art

Global navigation satellite system (GNSS) guidance and control are widely used for vehicle and personal navigation and a variety of other uses involving precision location and machine control in geodesic reference systems. GNSS, which includes the Global Positioning System (GPS) and other satellite-based positioning systems, has progressed to sub-centimeter accuracy with known correction techniques, including a number of commercial satellite-based augmentation systems (SBASs).

GNSS guidance devices currently come in a variety of forms and function in a variety of different ways. For instance, the typical commercial GNSS guidance device located in a standard vehicle contains a receiver, an antenna, a graphical interface to instruct the vehicle operator where to go, and a processor, e.g., a central processing unit (CPU), for running calculations and processing requests.

Other uses for GNSS guidance include using the GNSS device as a bearing device or directional receiver, i.e., a multi-antenna directional receiver. The GNSS system can be used to determine heading information for a host system, such as a vehicle or a piece of equipment. Typically a GNSS directional receiver has a centrally-located receiver and two or more separated antennas with low noise amplifiers (LNAs) to detect the phase differences among the carrier signals from GNSS satellites in various constellations, of which at least four satellites are visible at any given time for calculating GNSS-based position and heading fixes. Given the positions of the satellite, the position of the antenna, and the phase difference, the orientation of the two antennas can be computed. Additional antennas may be added to provide multiple readings with respect to each satellite, allowing three-dimensional (3D) position and heading solutions for the GNSS-equipped vehicle. A GNSS directional receiver is not subject to magnetic declination as a magnetic directional receiver is, and doesn't need to be reset periodically like a gyrodirectional receiver. It is, however, subject to multipath effects, which susceptibility is addressed by the present invention.

A potential performance-related receiver design problem relates to cross-coupling between the radio frequency (RF) signals from either or both of the two antennas: the master and the slave. This creates an error in the heading and position as the cross-coupled signal appears as a delay in time which smears the correlation peak and makes it more difficult to resolve the exact range to the satellite. This can also create a reduction in signal to noise ratio (SNR) if the cross-coupled signals cause a cancellation effect.

Another potential performance-related receiver design problem relates to digital signals being inherently noisy for RF as they have fast rising edges which have high harmonics content. These high harmonics can land in either the intermediate frequency (IF) or the RF frequency bands and increase the noise, thereby impairing the tracking of the desired signals. Still further, routing of the RF coaxial cables can create significant interference as they can pick up the digital harmonics and impair the signal tracking. If these signals are digital (especially low-voltage differential signal (LVDS)) they will not be as sensitive to picking up noise. Moreover, LVDSs do not generate as many emissions as normal single-ended digital signals. Different drivers exist for creating and receiving LVDSs.

The present invention addresses the RF-digital signal interference problems with previous GNSS receivers. Heretofore, there has not been available a signal-isolating GNSS receiver with the advantages and features of the present invention.

SUMMARY OF THE INVENTION

In the practice of the present invention an optimal layout is provided for a GNSS directional receiver, which is also referred to as a bearing or directional receiver device, resulting in a more efficient and accurate device for generating position and heading solutions based on GNSS signals. The present invention seeks to reduce or eliminate the signal interference and other shortcomings present in previous GNSS directional receiver devices currently available in the market.

BRIEF DESCRIPTION OF THE DRAWINGS

The accompanying drawings illustrate the principles of the present invention and an exemplary embodiment thereof.

DETAILED DESCRIPTION OF THE PREFERRED EMBODIMENT

I. Introduction, Environment, and Preferred Embodiment

Generally, a preferred embodiment of the present invention consists of rearranging the layout typically used in GNSS directional receivers. By rearranging the location of the various devices, moving all of the RF signals underneath the antennas and keeping a centrally-located area all digital, signal issues that typically impair signal tracking in the prior art are reduced or eliminated.

II. Prior Art Embodiment 2

Figure 1:
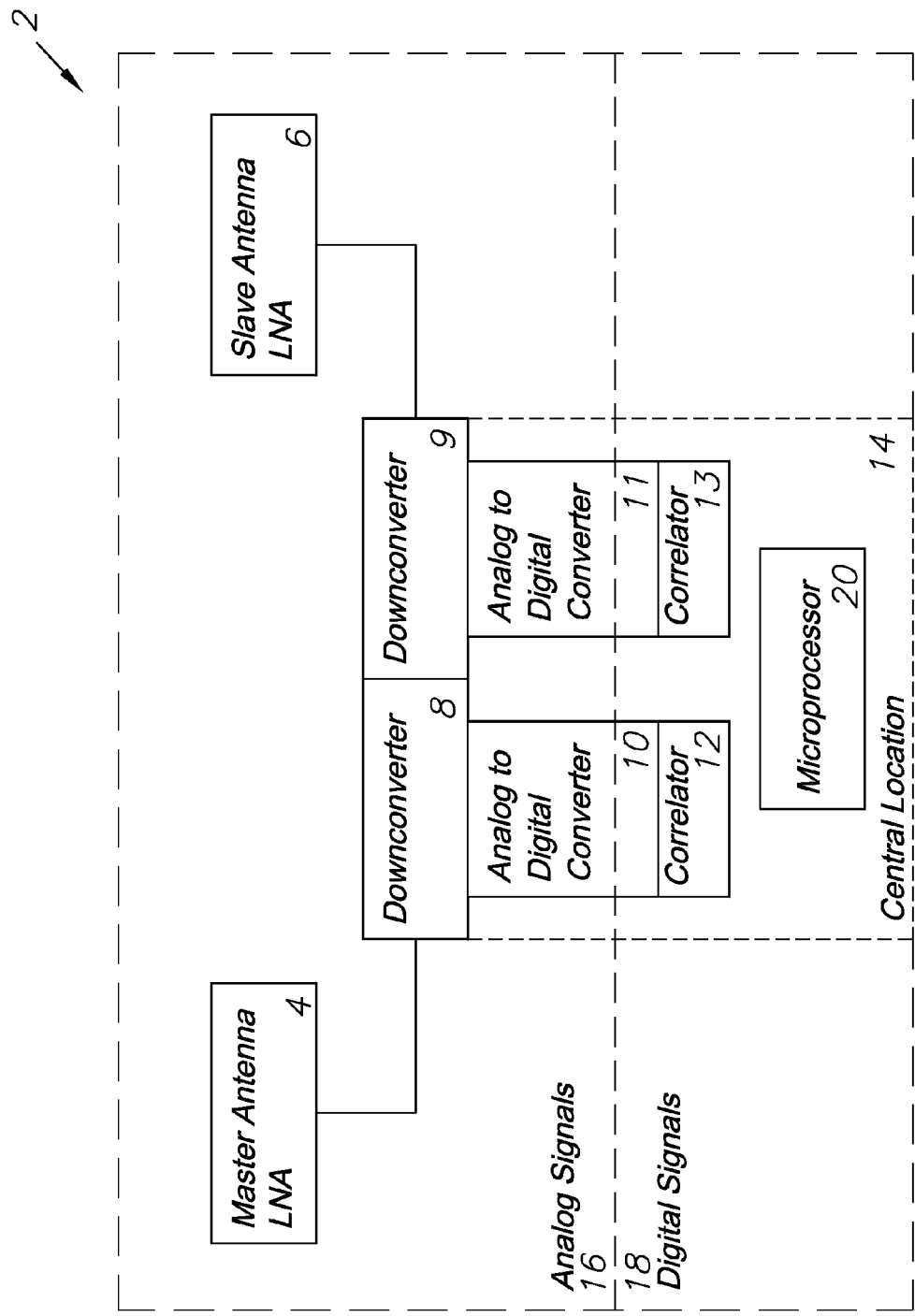
FIG. 1 is a diagram of a typical prior art GNSS directional receiver configuration.

FIG. 1 is a block diagram showing a typical layout of a prior art GNSS directional receiver 2. The directional receiver 2 is separated into two sides, one for handling analog signals 16 and one for handling digital signals 18, with components for transferring signals from analog to digital in between and located in the central location 14. The typical directional receiver 2 has a master antenna combined with a low noise amplifier (LNA) 4 and a slave antenna with an LNA 6, but may have additional antennas and LNAs.

The antennas 4, 6 are connected to a pair of downconverters 8, 9, one for each antenna, located within the central location 14. These feed the downconverted analog signals to a pair of analog to digital converters (ADCs) 10, 11, which transform the signal from analog to digital and pass the signal from the analog side 16 to the digital side 18 of the directional receiver 2. A pair of correlators 12, 13 then receive the digital signals.

A microprocessor 20 is located within the central location 14 and receives the converted and correlated digital signal and processes it. As the signal passes through the various stages of transfer within the directional receiver 2, it picks up noise and other errors which may affect the value of the signal being interpreted by the microprocessor. The present invention addresses these potential performance-related problems.

The typical directional receiver 2 utilizes coaxial cable for interconnection between components, such as between the antennas 4, 6 and the ADCs 10, 11.

III. Preferred Embodiment 22

Figure 2:
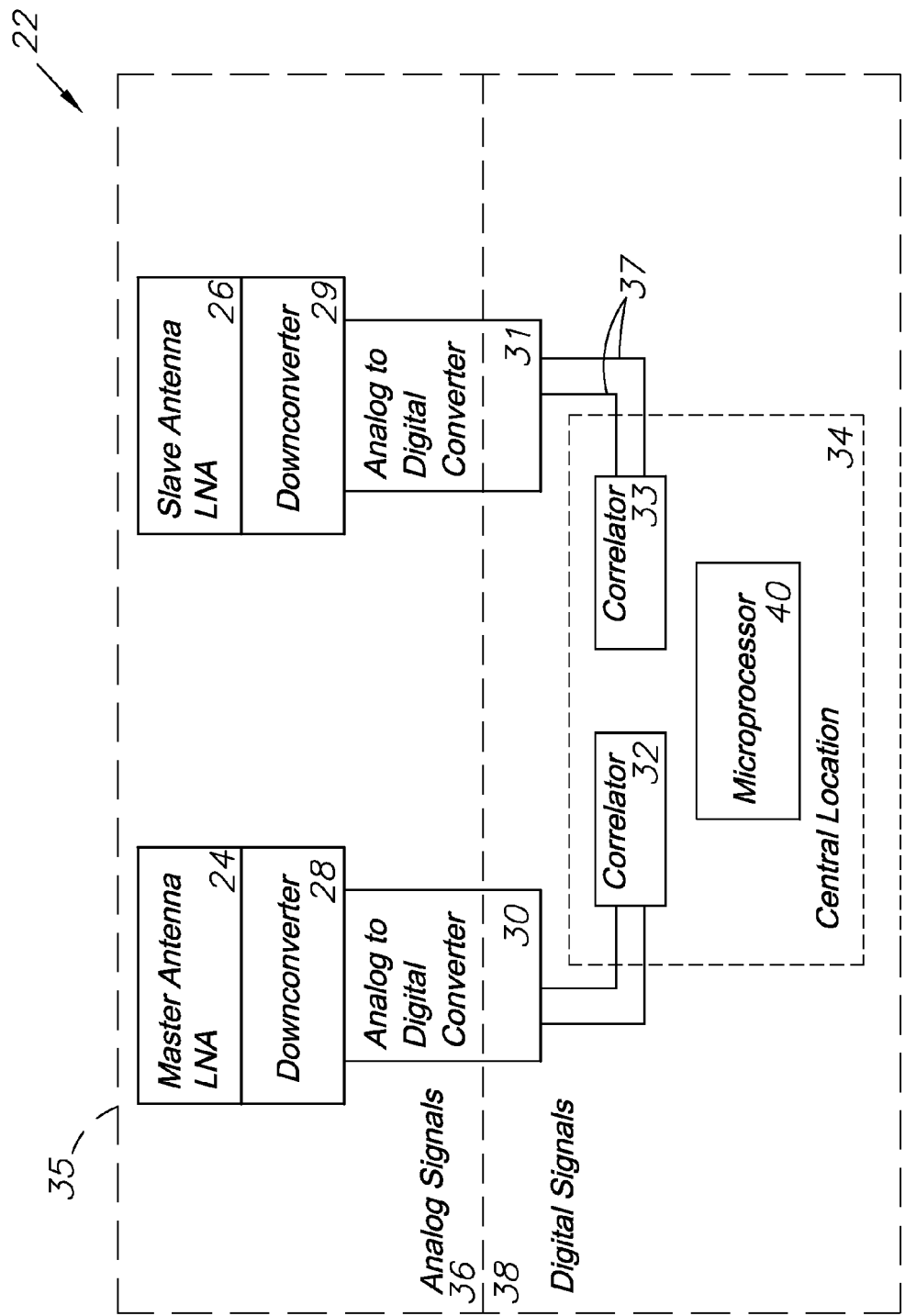
FIG. 2 is a diagram of an embodiment of the present invention, displaying the configuration of an optimized GNSS directional receiver system.

FIG. 2 is a diagram of a preferred embodiment of the present invention comprising a GNSS directional receiver 22 mounted onto a single printed circuit board (PCB) 35. In the preferred embodiment, the components have been rearranged over the prior art version shown in FIG. 1. The master antenna/LNA 24 and the slave antenna/LNA 26 are still aligned opposite of one another; however, the central location 34 has been moved entirely into the digital signal portion 38 of the directional receiver 22, and the rest remains on the analog portion 36. Each antenna 24, 26 is connected to a downconverter 28, 29 which feeds into an ADC 30, 31 in the same manner as the directional receiver of the prior art directional receiver 2. The ADCs 30, 31 are also connected to separate correlators 32, 33 located within the central location 34 with a microprocessor 40. The components function identically to the prior art directional receiver 2, but the arrangement of the components improves signal reception and processing.

The preferred embodiment 22 reduces the negative effects on signals prominent in the prior art directional receiver 2 as much as possible by moving all of the RF signals under the antennas and keeping the centrally-located area all digital. This is accomplished by moving the RF downconverters 28, 29 and ADCs 30, 31 under the antennas 24, 26. The digitized RF is brought into the GNSS digital section in the center using low-voltage differential signals (LVDS), or other digital communication means. Differential communication minimizes noise radiation and pick up and is recommended, but for short paths or shielded links a simple logic level communication is possible.

Separating the digital signals from the RF (IF and analog signals) as much as possible tends to minimize the digital harmonics causing an interference issue. If these signals are digital (especially LVDS), they will not be as sensitive to picking up noise. LVDS also will not generate as many emissions as a normal single-ended digital signal. This is due to the differential nature of the communication architecture. Having a balanced (a positive path and a negative path) signal creates a cancellation effect of radiated signals so the balanced signal does not radiate or pick up noise.

Whereas the typical directional receiver 2 in the existing art uses coaxial cable for component connection, the preferred embodiment 22 utilizes a group of LVDS lines 37. These lines may optionally be shielded. Shielding will reduce electronic noise and increase the signal performance of the preferred embodiment 22 over the prior art.

The use of a single PCB 35 with the component arrangement as discussed herein allows for a lightweight heading and positioning compass to be easily constructed and employed in both marine and land use settings.

Figure 3:
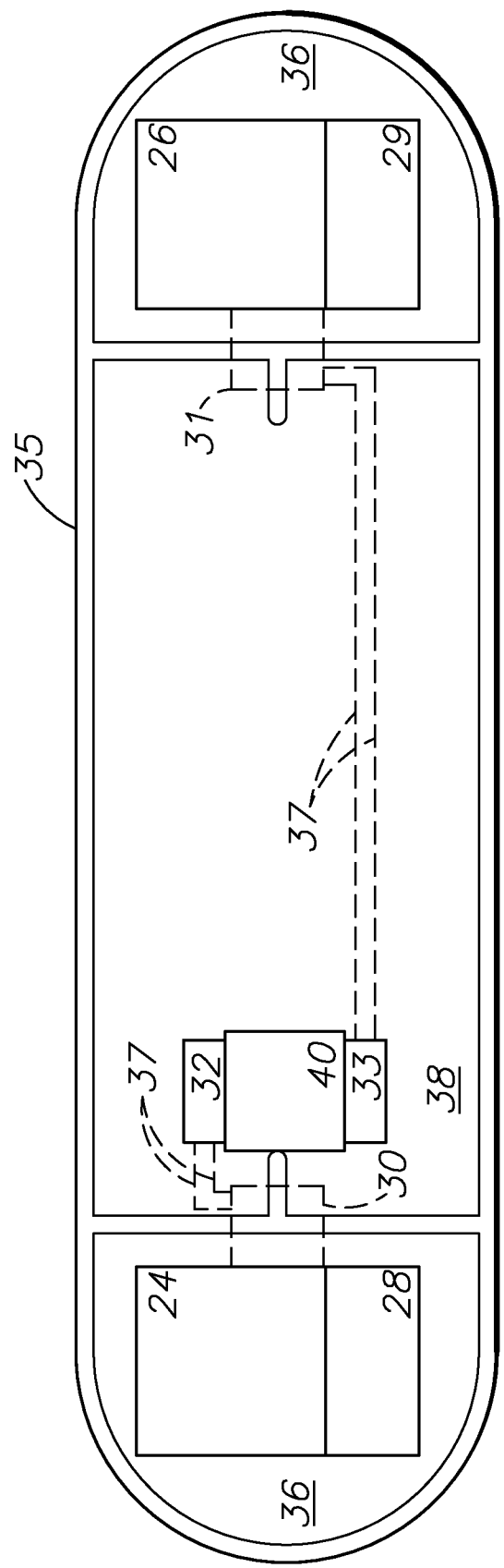
FIG. 3 is a top plan view of a printed circuit board arrangement embodying an aspect of the present invention.

FIG. 3 demonstrates an actual arrangement of the various components on a single PCB 35. As can be seen, the analog portions 36 and the digital portion 38 are physically separated. Only the analog-to-digital converters 30, 31 cross between the two different realms. FIG. 3 therefore demonstrates a manufactured, light-weight receiver capable of being used in a multitude of components, including in a GNSS compass capable of providing vehicle location and heading. Additional components necessary for function would be located on the surface of the PCB, such as connection means and power means.

IV. Alternative Embodiment 42

Figure 4:
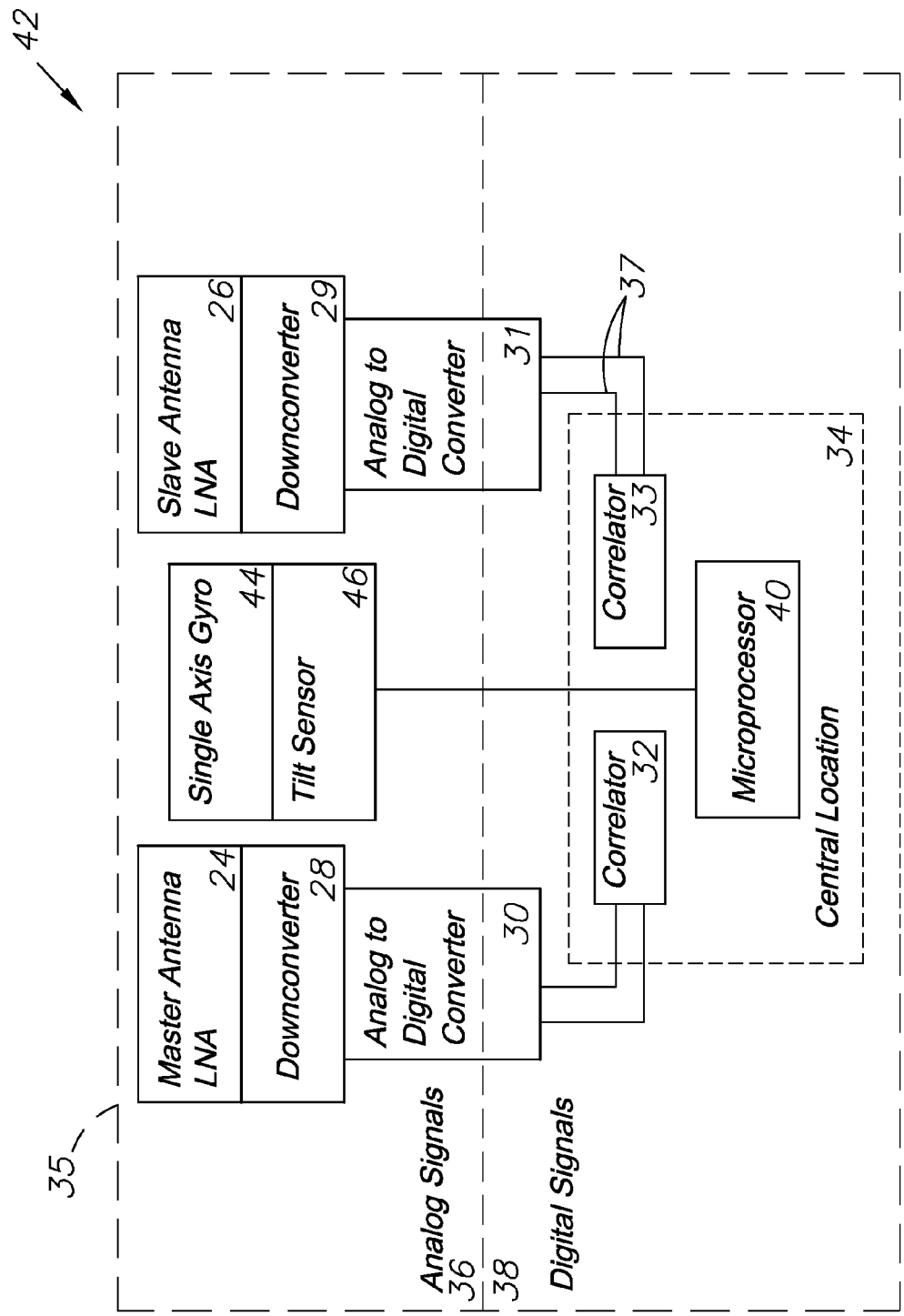
FIG. 4 is a diagram of an alternative embodiment of the present invention, displaying the configuration of an optimized GNSS directional receiver system with a gyro and tilt sensor component.

FIG. 4 demonstrates a slight alternative embodiment receiver 42 to that shown in FIG. 2. The alternative embodiment includes a single axis gyro 44 and at least one tilt sensor 46 also mounted to the single circuit board 35 and communicating with the processor 40 through LVDS lines 37. This feature provides increased accuracy in the receiver when used as a compass for measuring heading and positioning, as well as providing heave, pitch and roll output.

It will be appreciated that the components of the receiver can be used for various other applications. Moreover, the subsystems, units and components of the receiver can be combined in various configurations within the scope of the present invention. For example, the various units could be combined or subdivided as appropriate for particular applications. The receiver is scalable as necessary for applications of various complexities. It is to be understood that while certain aspects of the disclosed subject matter have been shown and described, the disclosed subject matter is not limited thereto and endirectional receivers various other embodiments and aspects.

Having thus described the invention, what is claimed as new and desired to be secured by Letters Patent is:

1. A method of reducing internally generated digital noise in an RF/digital directional receiver, which method comprises the steps of physically:
   providing first and second antennas positioned in spaced relation in said receiver;
   providing first and second RF downconverters each located directly adjacent and connected via a common printed circuit board (PCB) to a respective antenna;
   providing first and second analog-to-digital converters (ADCs) each connected via a common PCB to a respective downconverter;
   locating said first and second downconverters and said first and second ADCs in a first analog signal area under said first antenna and a second analog signal area under said second antenna respectively;
   providing a digital signal area, adjacent to said first and second analog signal areas, located centrally relative to said first and second antennas;
   providing first and second correlators in said digital signal central location and connected to said first and second ADCs respectively;

providing a microprocessor in said digital signal central location and connected to and receiving input from said first and second correlators using low voltage differential signal (LVDS) lines;

processing analog signals in said first and second analog signal areas under said first and second antennas, respectively;

processing digital signals in said digital signal central location;

providing first and second low noise amplifiers (LNAs) connected to said first and second antennas and to said first and second downconverters respectively;

providing first and second shielded LVDS lines between said first and second ADCs in said first and second analog signal areas under said antennas and said first and second correlators in said digital signal central location respectively; and communicating digital signals from said first and second ADCs to said first and second correlators over said first and second LVDS lines respectively;

wherein the physical arrangement of the antennas, LNAs, downconverters and ADCs in said first and second analog signal areas, the correlators and microprocessor in said digital signal area, and the use of the LVDS lines to connect the ADCs with the correlators on the common PCB reduces the internally generated digital noise in the RF/digital directional receiver.

2. The method according to claim 1, further comprising the steps:

providing a single-axis gyro located within said analog section;

providing at least one tilt sensor connected to said single-axis gyro and actively monitoring said single-axis gyro; and connecting said tilt sensor to said microprocessor using at least one LVDS line.

3. A GNSS compass for use with a vehicle, said compass comprising:

a single common printed circuit board (PCB) including a first analog signal portion, a second analog signal portion, and a digital signal portion adjacent said first and second analog signal portions and located centrally relative to said first and second analog signal portions;

first and second antennas positioned in spaced relation and located within said first and second analog signal portions of said PCB, respectively;

first and second RF downconverters each located directly adjacent and under, and connected via said PCB to, said first antenna within said first analog signal portion, and said second antenna within said second analog signal portion, respectively;

first and second analog-to-digital converters (ADCs) each connected via said PCB to a respective downconverter within said first analog signal portion and said second analog signal portion, respectively, and each located under said first antenna and said second antenna, respectively;

first and second correlators located in said digital signal portion and connected to said first and second ADCs respectively;

a microprocessor located in said digital signal portion and connected to and receiving input from said first and second correlators using low-voltage differential signal (LVDS) lines;

first and second low noise amplifiers (LNAs) connected to said first and second antennas and to said first and second downconverters respectively;

providing first and second shielded LVDS lines between said first and second ADCs in said first and second analog signal portions under said first and second antennas and said first and second correlators in said digital signal portion respectively;

wherein analog signals are generated within said first and second analog signal portions;

wherein digital signals are processed within said digital signal portion;

a housing containing said PCB and all components connected to said PCB; and wherein the location and heading of a vehicle to which said housing is affixed is calculated by said microprocessor.

4. The GNSS compass of claim 3, further comprising:

a single-axis gyro located within at least one analog signal portion;

at least one tilt sensor connected to said single-axis gyro and actively monitoring said single-axis gyro;

wherein said tilt sensor is connected to said microprocessor using at least one LVDS line; and wherein the heave, pitch and roll of the vehicle is calculated by said microprocessor.

5. The GNSS compass of claim 3, wherein said vehicle is a marine vehicle.

* * * * *